United States Patent [19]

Washizu et al.

[11] Patent Number: 5,402,441
[45] Date of Patent: Mar. 28, 1995

[54] SIGNAL RECEIVER FOR GLOBAL POSITIONING SYSTEM

[75] Inventors: Koichi Washizu; Toshihiro Kawazoe; Yorihisa Suwa; Yukio Yokoi; Chogo Sekine, all of Mitaka; Tomio Yasuda, Kariya; Toshimitsu Oka, Okazaki; Yuichi Murakami, Chiryu; Tomohiro Yamamoto, Anjo; Seiji Ishikawa, Kariya, all of Japan

[73] Assignees: Japan Radio Co., Ltd.; Aisin Seiki Kabushiki Kaisha, both of Tokyo, Japan

[21] Appl. No.: 108,079

[22] Filed: Aug. 17, 1993

[30] Foreign Application Priority Data

Aug. 20, 1992 [JP] Japan .................................. 4-221658

[51] Int. Cl.6 .............................................. G01S 5/02
[52] U.S. Cl. ...................................... 375/208; 342/357
[58] Field of Search ...................... 342/148, 357; 375/1

[56] References Cited

U.S. PATENT DOCUMENTS

| | | | |
|---|---|---|---|
| 4,646,096 | 2/1987 | Brown | 342/357 |
| 4,894,662 | 1/1990 | Counselman | 342/357 |
| 4,972,431 | 11/1990 | Keegan | 375/1 |
| 5,103,459 | 4/1992 | Gilhousen et al. | 375/1 |
| 5,157,691 | 10/1992 | Ohkubo et al. | 375/98 |
| 5,185,610 | 2/1993 | Ward et al. | 342/357 |
| 5,309,474 | 5/1994 | Gilhousen et al. | 375/1 |

OTHER PUBLICATIONS

Global Positioning System, The Institute of Navigation, 1980, pp. 8–11, 36, 51–53, 86, 115–117.

Primary Examiner—Salvatore Cangialosi
Attorney, Agent, or Firm—Frishauf, Holtz, Goodman & Woodward

[57] ABSTRACT

A GPS signal receiver has a PN code generator for producing a PN code identical to a PN code in a received GPS signal which is transmitted from a GPS satellite, the PN code produced by the PN code generator being controllable in phase, a PN code correlator for correlating the received GPS signal with the PN code produced by the PN code generator so as to code-strip the received GPS signal, a signal search unit for monitoring a correlated output signal from the PN code correlator and controlling the phase of the PN code produced by the PN code generator to search for a correlated output signal in excess of a predetermined value, a signal determining unit for determining the correlated output signal in excess of the predetermined value as being produced by a direct wave of the GPS signal, and a signal tracking unit for controlling the phase of the PN code produced by the PN code generator to track a peak of the correlated output signal that is determined as being produced by the direct wave of the GPS signal.

2 Claims, 4 Drawing Sheets

SIGNAL RECEIVER FOR GLOBAL POSITIONING SYSTEM

BACKGROUND OF THE INVENTION

1. Field of the Invention:

The present invention relates to a signal receiver for use in a global positioning system (GPS), and more particularly to a GPS signal receiver suitable for use especially in regions which suffer multipath interference.

2. Description of the Related Art

One conventional GPS signal receiver is shown in FIG. 1 of the accompanying drawings. As shown in FIG. 1, a signal transmitted from a GPS satellite (hereinafter referred to as a "GPS signal") is received by an antenna 1 on a mobile body such as an automobile, amplified by an RF amplifier 2, and converted into an intermediate-frequency signal by a frequency converter 3 for easy subsequent signal processing. Since the GPS signal has been modulated by a PN (pseudorandom noise) code so as to be spectrum-spread, it is necessary that the received GPS signal be correlated with a locally generated PN code so as to be code-stripped. To meet such a requirement, the GPS signal as converted into the intermediate-frequency signal is supplied to a PN code correlator 5 which also is supplied with a PN code generated by a PN code generator 4, and correlated with the PN code from the PN code generator 4 so as to be code-stripped by the PN code correlator 5 (see, for example, GLOBAL POSITIONING SYSTEM (Papers published in NAVIGATION), P.M. Janiczek, Editor, The Institute of Navigation, 1980, pp 51-53, Spilker: "Signal Structure and Performance Characteristics")

An output signal from the PN code correlator 5 is supplied selectively to a signal search unit 7 and a signal tracking unit 9 through a switch 6A. Output signals from the signal search unit 7 and the signal tracking unit 9 are supplied to a PN code phase control unit 10A, which produces an output signal to control the phase of a PN code generated by the PN code generator 4.

After the power supply of the conventional GPS signal receiver is switched on, the switch 6A is shifted over to the signal search unit 7. Until the PN code of the received GPS signal as converted into the intermediate-frequency signal is brought into phase with the PN code generated by the PN code generator 4, the phase of the PN code generated by the PN code generator 4 is successively varied to various phases in response to the output signal from the signal search unit 7 under the control of the PN code phase control unit 10A. At this time, the correlated output signal from the PN code correlator 5 is monitored by the signal search unit 7 which searches for a point where the correlated output signal exceeds a predetermined value.

When the correlated output signal exceeds the predetermined value, the switch 6A is shifted over to the signal tracking unit 9, and the correlated output signal from the PN code correlator 5 is monitored by the signal tracking unit 9. The phase of the PN code produced by the PN code generator 4 is controlled by the PN code phase control unit 10A such that the correlated output signal will remain at its peak value.

When the PN code of the received GPS signal is out of phase with the PN code generated by the PN code generator 4, the correlated output signal is low. Conversely, when the PN code of the received GPS signal is in phase with the PN code generated by the PN code generator 4, the correlated output signal is high, as shown in FIG. 2 of the accompanying drawings. The correlated output signal is substantially eliminated if the PN codes are shifted out of phase with each other by one bit. In the conventional GPS signal receiver, therefore, the GPS signal is tracked to keep the peak value of the correlated output signal which has been searched for by the signal search unit 7.

However, the conventional GPS signal receiver has suffered the following disadvantages: When the GPS signal receiver is installed on an automobile and moved through an environment or region being subjected to multipath interference, such as an urban district, there is caused a differential delay between a direct wave and a multipath wave. At this time, if the correlated output signal searched for by the signal search unit 7 is produced by the multipath wave, then the measured position that is obtained by a GPS associated with the GPS signal receiver tends to deviate from an actual position. Furthermore, as the automobile moves, the multipath around the automobile varies from time to time, and hence the measured position suffers various deviations or errors. Consequently, the conventional GPS signal receiver fails to give accurate information which would enable the GPS to produce accurate measured positions (see, for example, ibid, pp 8-11, Milliken & Zoller: "Principle of Operation of NAVSTAR and System Characteristics", p 36, Spilker: "Signal Structure and Performance Characteristics", p 86, Glazer: "GPS Receiver Operation" and pp 115-117, Martin: "User Equipment Error Models").

SUMMARY OF THE INVENTION

It is therefore an object of the present invention to provide a GPS signal receiver capable of detecting and tracking a GPS signal received by way of direct waves thereby to prevent a measured position from suffering an error even when the GPS signal receiver is used in multipath environments.

Another object of the present invention is to provide a GPS signal receiver which is effective to avoid noise-induced errors in determining correlated output signals as being produced by direct waves.

According to the present invention, there is provided a GPS signal receiver comprising a PN code generator for producing a PN code identical to a PN code in a received GPS signal which is transmitted from a GPS satellite, the PN code produced by the PN code generator being controllable in phase, a PN code correlator for correlating the received GPS signal with the PN code produced by the PN code generator so as to code-strip the received GPS signal, a signal search unit for monitoring a correlated output signal from the PN code correlator and controlling the phase of the PN code produced by the PN code generator to search for a correlated output signal in excess of a predetermined value, a signal determining unit for determining the correlated output signal in excess of the predetermined value as being produced by a direct wave of the GPS signal, and a signal tracking unit for controlling the phase of the PN code produced by the PN code generator to track a peak of the correlated output signal that is determined as being produced by the direct wave of the GPS signal.

The signal determining unit may comprise a memory having a first storage area for storing the correlated output signal in excess of the predetermined value and a second storage area for storing a correlated output signal which is produced when the phase of the PN code produced by the PN code generator is shifted into a previous phase after the correlated output signal in excess of the predetermined value has been stored in the first storage area, a comparator for comparing the level of the correlated output signal stored in the first storage area with the level of the correlated output signal stored in the second storage area, and the signal determining unit may determine the correlated output signal stored in the second storage area as being produced by the direct wave of the GPS signal when the level of the correlated output signal stored in the second storage area is greater than the level of the correlated output signal stored in the first storage area, and the correlated output signal stored in the first storage area as being produced by the direct wave of the GPS signal when the level of the correlated output signal stored in the first storage area is greater than the level of the correlated output signal stored in the second storage area.

In the above-described GPS signal receiver according to the present invention, the phase of the PN code produced by the PN code generator is controlled and the signal search unit searches for the correlated output signal which is in excess of the predetermined value. The correlated output signal in excess of the predetermined value is determined by the signal determining unit as being produced by the direct wave of the GPS signal. When the correlated output signal in excess of the predetermined value is determined as being produced by the direct wave of the GPS signal, the peak of the correlated output signal is tracked by the signal tracking unit whose output signal controls the phase of the PN code produced by the PN code generator. Therefore, the correlated output signal produced by the direct wave is tracked in environments that are subjected to multipath interference to thereby prevent measured position errors from being caused and allow accurate measured positions to be obtained.

In the case where the signal determining unit comprises the memory and the comparator, the correlated output signal stored in the second storage area is determined as being produced by the direct wave of the GPS signal when the level of the correlated output signal stored in the second storage area is greater than the level of the correlated output signal stored in the first storage area. More specifically, the direct wave is detected earlier than a multipath wave and attenuated less than the multipath wave. Therefore, since the correlated output signal stored in the second storage area is detected earlier than the correlated output signal stored in the first storage area and greater in level than correlated output signal stored in the first storage area, the correlated output signal stored in the second storage area is determined as being produced by the direct wave of the GPS signal. Conversely, when the level of the correlated output signal stored in the first storage area is greater than the level of the correlated output signal stored in the second storage area, the correlated output signal stored in the first storage area is determined as being produced by the direct wave of the GPS signal. More specifically, though the correlated output signal stored in the first storage area is produced later than the correlated output signal stored in the second storage area, the level of the correlated output signal stored in the first storage area is greater than the level of the correlated output signal stored in the second storage area. Consequently, the correlated output signal stored in the second storage area is determined as being induced by noise, and hence noise-induced erroneous determination of correlated output signals as being produced by direct waves is prevented from occurring.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
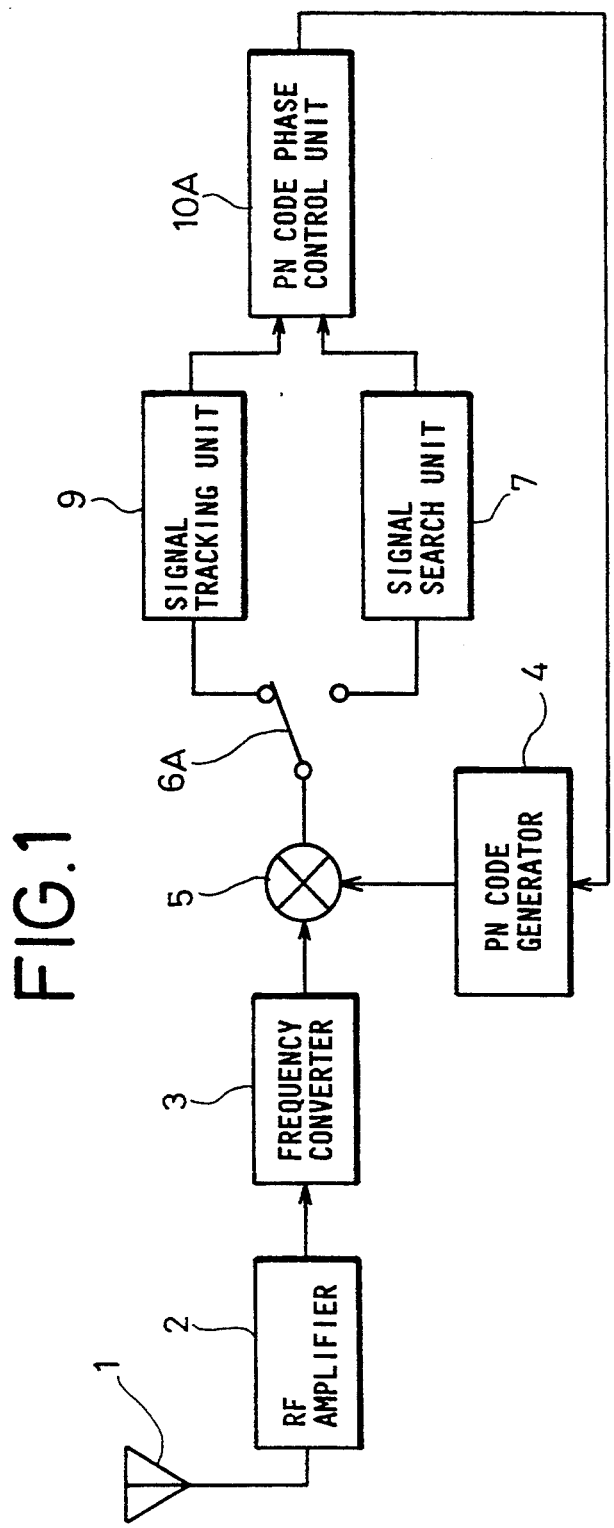
FIG. 1 is a block diagram of a conventional GPS signal receiver.
Figure 2:
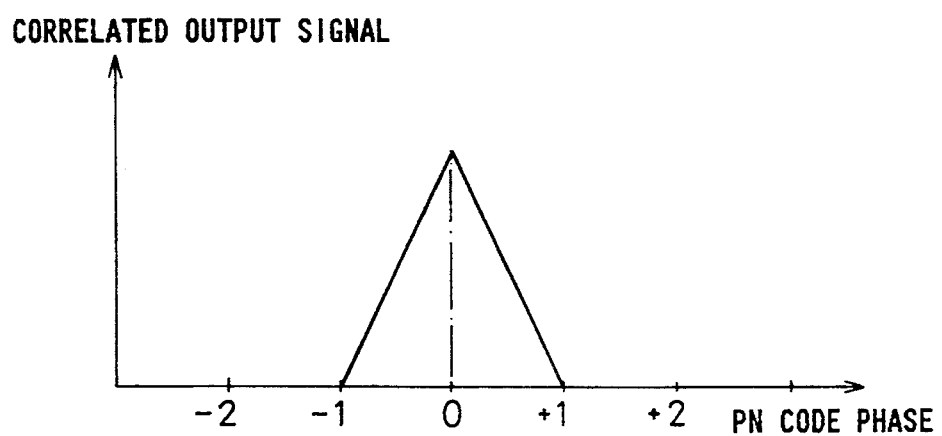
FIG. 2 is a diagram showing correlated output signals from a PN code correlator of the conventional GPS signal receiver shown in FIG. 1.
Figure 3:
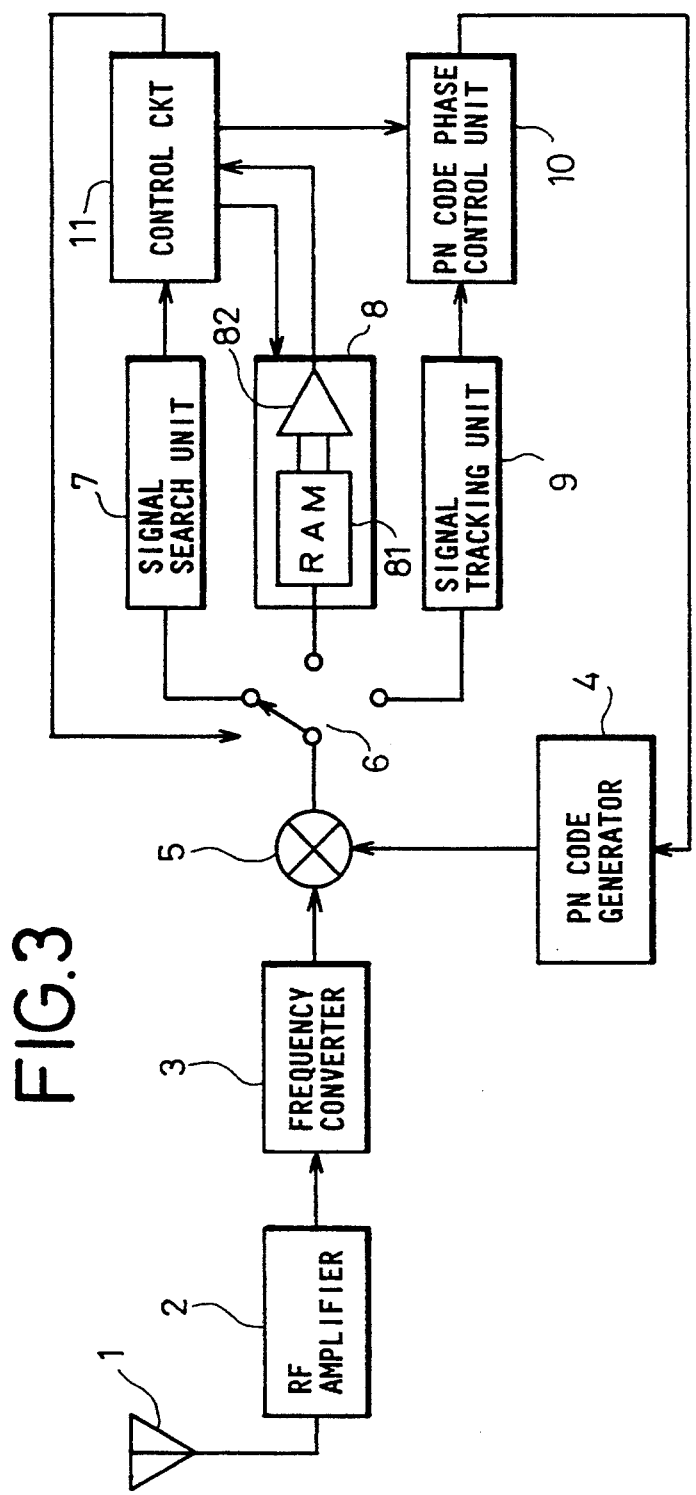
FIG. 3 is a block diagram of a GPS signal receiver according to the present invention.

As shown in FIG. 3, a GPS signal receiver according to the present invention, which is typically used in combination with a GPS, has an antenna 1 on a mobile body such as an automobile for receiving a GPS signal transmitted from a GPS satellite, an RF amplifier 2 for amplifying the received GPS signal, and a frequency converter 3 for converting the received GPS signal into an intermediate-frequency signal for easy subsequent signal processing. The GPS signal as converted into the intermediate-frequency signal is supplied to a PN code correlator 5 which is supplied with a PN code generated by a PN code generator 4, and correlated to be code-stripped by the PN code correlator 5.

An output signal from the PN code correlator 5 is supplied selectively to a signal search unit 7, a signal determining unit 8, and a signal tracking unit 9 through a switch 6. An output signal from the signal search unit 7 is supplied through a control circuit 11 to a PN code phase control unit 10, and an output signal from the signal tracking unit 9 is supplied directly to the PN code phase control unit 10, which produces an output signal to control the phase of the PN code generated by the PN code generator 4.

The signal search unit 7 searches for a correlated output signal that is supplied from the PN code correlator 5 through the switch 6, and supplies its output signal to the control circuit 11 when the correlated output signal exceeds a predetermined value. The signal tracking unit 9 produces a PN code phase control signal in response to a correlated output signal that is supplied from the PN code correlator 5 through the switch 6, and controls the PN code phase control unit 10 with the produced PN code phase control signal to track the GPS signal that is received.

The signal determining unit 8 has a RAM 81 having first and second storage areas for storing correlated output signal levels that have been supplied at different times through the switch 6, and a comparator 82 for comparing the correlated output signal levels stored in the first and second storage areas of the RAM 81.

An output signal from the signal search unit 7 and an output signal from the comparator 82 of the signal determining unit 8 are supplied to the control circuit 11, which comprises a computer for controlling the RAM 81 and the PN code phase control unit 10. Based on the output signal from the signal search unit 7, an output signal from the control circuit 11 controls the PN code phase control unit 10 to search for correlated output signals. The control circuit 11 cooperates with the comparator 82 in distinguishing direct waves from multipath waves and selecting a correlated output signal to be tracked.

The output signal from the PN code phase control unit 10 is sent to the PN code generator 4 to control the phase of a PN code that is produced by the PN code generator 4.

After the power supply of the GPS signal receiver is switched on, the switch 6 is shifted over to the signal search unit 7. Until the PN code of the received GPS signal as converted into the intermediate-frequency signal is brought into phase with the PN code generated by the PN code generator 4, the correlated output signal from the PN code correlator 5 is monitored by the signal search unit 7, which produces an output signal to enable the control circuit 11 to control the PN code phase control unit 10 to successively vary the phase of the PN code generated by the PN code generator 4 to various phases for thereby searching for a point where the correlated output signal exceeds a predetermined value.

Based on a signal indicating that the correlated output signal searched for by the signal search unit 7 exceeds the predetermined value, the control circuit 11 shifts the switch 6 over to the signal determining unit 8, and stores the correlated output signal in excess of the predetermined value into the first storage area of the RAM 81. Then, the control circuit 11 shifts the switch 6 over to the signal search unit 7 again, and controls the PN code phase control unit 10 to control the PN code generator 4 to shift the phase of the PN code generated by the PN code generator 4 over a certain phase range into a previous phase. Then, the control circuit 11 controls the second storage area of the RAM 81 to store the correlated output signal which is produced by the PN code correlator 5 in excess of the predetermined value when the phase of the PN code is shifted into the previous phase.

The phase of the PN code is shifted into the previous phase range after the correlated output signal has been detected as exceeding the predetermined value as described above for the reason of determining whether the detected correlated output signal is produced by the direct wave or one of multipath waves.

More specifically, the multipath wave reaches the antenna 1 after having been reflected by an object such as a building or the like. Therefore, such a multipath wave is propagated through a longer transmission path than the direct wave, and hence is received by the antenna 1 later than the corresponding direct wave is received by the antenna 1. In addition, the multipath wave has a lower signal intensity than the corresponding direct wave because it is attenuated when reflected.

Utilizing the above property of multipath waves, the phase of the PN code produced by the PN code generator 4 is varied by the PN code phase controller 10. As described above, the phase of the PN code generated by the PN code generator 4 is shifted into the previous phase which is ahead of the time when the correlated output signal is detected as exceeding the predetermined value by the signal search unit 7. With the PN code shifted into the previous phase, the correlated output signal from the PN code correlator 5 is monitored by the signal determining unit 8.

Figure 4:
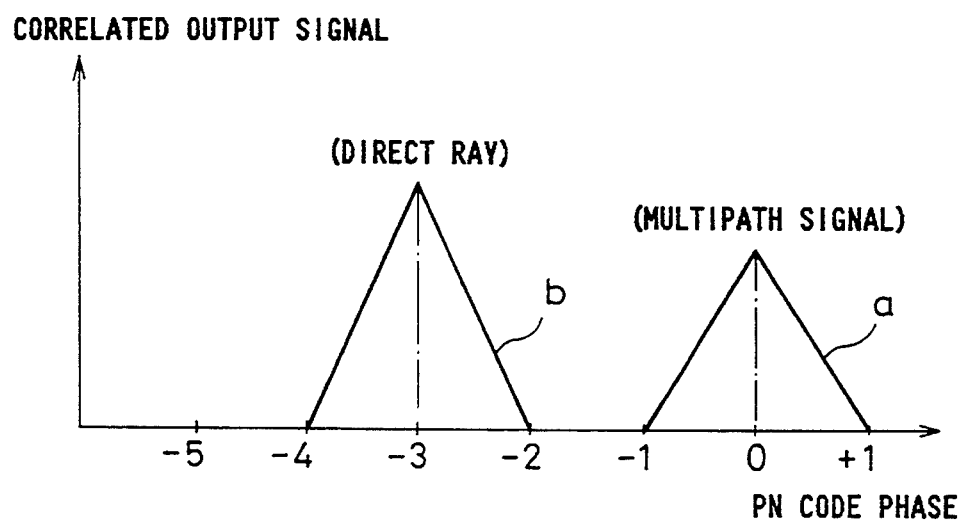
FIG. 4 is a diagram showing correlated output signals which are compared with each other by a comparator in a signal determining unit of the GPS signal receiver shown in FIG. 3.

FIG. 4 shows different correlated output signals that are compared with each other by the comparator 82 in the signal determining unit 8. A correlated output signal peak, indicated by a curve a, is detected as exceeding a predetermined value by the signal search unit 7. If another correlated output signal peak, indicated by a curve b, is produced when the code of the PN code is shifted into the previous phase, the levels of the correlated output signal peaks a, b are compared with each other by the comparator 82. If the correlated output signal peak b is greater in level than the correlated output signal peak a and produced earlier than the correlated output signal peak a, then the correlated output signal peak b is determined as being produced by the direct wave. Which one of the correlated output signal peaks a, b is earlier than the other can easily be determined because the correlated output signal stored in the second storage area of the RAM 81 is earlier than the correlated output signal stored in the first storage area of the RAM 81.

If no correlated output signal peak is produced when the phase of the PN code produced by the PN code generator 4 is shifted into a previous phase, then there is no correlated output signal peak in advance of the correlated output signal peak a and hence the correlated output signal peak a is essentially early. Since no correlated output signal to be compared with the correlated output signal peak a is stored in the second storage area of the RAM 81, the correlated output signal peak a is determined as being produced by the direct wave.

The levels of the correlated output signal peaks a, b are compared with each other by the comparator 82 as described above in order to avoid any decision error which would otherwise be caused if a noise-induced correlated output signal peak exists prior to the correlated output signal peak a. For example, when a noise-induced correlated output signal peak b is detected in advance of the correlated output signal peak a, the level of the noise-induced correlated output signal peak b is determined as being lower than the level of the correlated output signal peak a. Therefore, even though the noise-induced correlated output signal peak b is earlier than the correlated output signal peak a, the correlated output signal peak a is determined as being produced by the direct wave. Inasmuch as a correlated output signal peak produced by the direct wave is supposed to be greater in level than a correlated output signal peak produced by the multipath wave, the noise-induced correlated output signal peak b which is lower in level than the correlated output signal peak a is not determined as being produced by the direct wave though it is produced earlier than the correlated output signal peak a. Consequently, such a noise-induced correlated output signal peak is prevented from being erroneously determined as being produced by the direct wave.

When a correlated output signal peak produced by the direct wave is determined by the signal determining unit 8, the switch 6 is shifted over to the signal tracking unit 9 by an output signal from the control circuit 11. The correlated output signal from the PN code correlator 5 is monitored by the signal tracking unit 9. The phase of the PN code produced by the PN code generator 4 is controlled by the PN code phase control unit 10 such that the correlated output signal will remain at the peak value in the phase of the PN code at the time the correlated output signal is produced by the direct wave.

When the correlated output signal peak is no longer tracked, the switch 6 is shifted over to the signal search unit 7 again by the control circuit 11, and the above process is repeated again.

With the GPS signal receiver according to the present invention, as described above, the signal determining unit 8 determines whether the correlated output signal searched for by the signal search unit 7 is produced by the direct wave of the GPS signal or not, and the correlated output signal peak which is determined as being produced by the direct wave is tracked by the signal tracking unit 9. Therefore, even when the GPS signal receiver is used in environments subjected to multipath interference, the GPS signal receiver does not track any correlated output signals produced by multipath waves, and hence does not cause measured position errors which would otherwise be induced by multipath transmission. Consequently, the GPS signal receiver allows the GPS combined therewith to produce accurate measured positions based on GPS signals received thereby. The GPS signal receiver is also effective to avoid noise-induced errors in determining correlated output signals as being produced by direct waves.

Although a certain preferred embodiment of the present invention has been shown and described in detail, it should be understood that various changes and modifications may be made therein without departing from the scope of the appended claims.

What is claimed is:

1. A GPS signal receiver comprising:
   a PN code generator for producing a PN code identical to a PN code in a received GPS signal which is transmitted from a GPS satellite, the PN code produced by said PN code generator being controllable in phase;
   a PN code correlator for correlating the received GPS signal with the PN code produced by said PN code generator so as to code-strip the received GPS signal;
   A signal search unit for monitoring a correlated output signal from said PN code correlator and controlling the phase of the PN code produced by said PN code generator to search for a correlated output signal having a signal strength in excess of a predetermined value;
   a signal determining unit for determining said correlated output signal in excess of said predetermined value as being produced by a GPS radio wave which arrives at said GPS signal receiver through a direct path from the GPS satellite, wherein said signal determining unit includes a discriminator for discriminating said GPS signal from two correlated output signals, both of said two correlated output signals having signal strengths above said predetermined value and said two correlated output signals differing in phase from each other; and
   a signal tracking unit for controlling the phase of the PN code produced by said PN code generator to track a peak of the correlated output signal that is determined as being produced by said GPS radio wave.

2. A GPS signal receiver according to claim 1,
   wherein said signal determining unit comprises a memory having a first storage area for storing a first one of said two correlated output signals having a signal strength in excess of said predetermined value and a second storage area for storing a second one of said two correlated output signals which is produced when the phase of the PN code produced by said PN code generator is shifted into a previous phase after said first correlated output signal having a signal strength in excess of said predetermined value has been stored in said first storage area, and a comparator for comparing the level of the correlated output signal stored in said first storage area with the level of the correlated output signal stored in said second storage area, and
   wherein said signal determining unit determines the correlated output signal stored in said second storage area as being produced by the GPS radio wave which arrives at said GPS signal receiver through said direct path from the GPS satellite when the level of the correlated output signal stored in said second storage area is greater than the level of the correlated output signal stored in said first storage area, and the correlated output signal stored in said first storage area as being produced by the GPS radio wave which arrives at said GPS signal receiver through said direct path from the GPS satellite when the level of the correlated output signal stored in said first storage area is greater than the level of the correlated output signal stored in said second storage area.

* * * * *

UNITED STATES PATENT AND TRADEMARK OFFICE
CERTIFICATE OF CORRECTION

PATENT NO. : 5,402,441
DATED : March 28, 1995
INVENTOR(S) : WASHIZU et al.

It is certified that error appears in the above-indentified patent and that said Letters Patent is hereby corrected as shown below:

Title page, Item [73] Assignees, after "Japan Radio Co., Ltd." insert, --, Tokyo, Japan--;

after "Aisin Seiki Kabushiki Kaisha," delete,

"both of Tokyo, Japan"; and insert, --Aichi-Ken, Japan--

Signed and Sealed this

Sixth Day of August, 1996

Attest:

BRUCE LEHMAN

*Attesting Officer*         *Commissioner of Patents and Trademarks*